Dec. 10, 1935.   H. KÜPPENBENDER ET AL   2,023,838
COMBINED DISTANCE METER AND VIEW FINDER
Original Filed Jan. 20, 1934
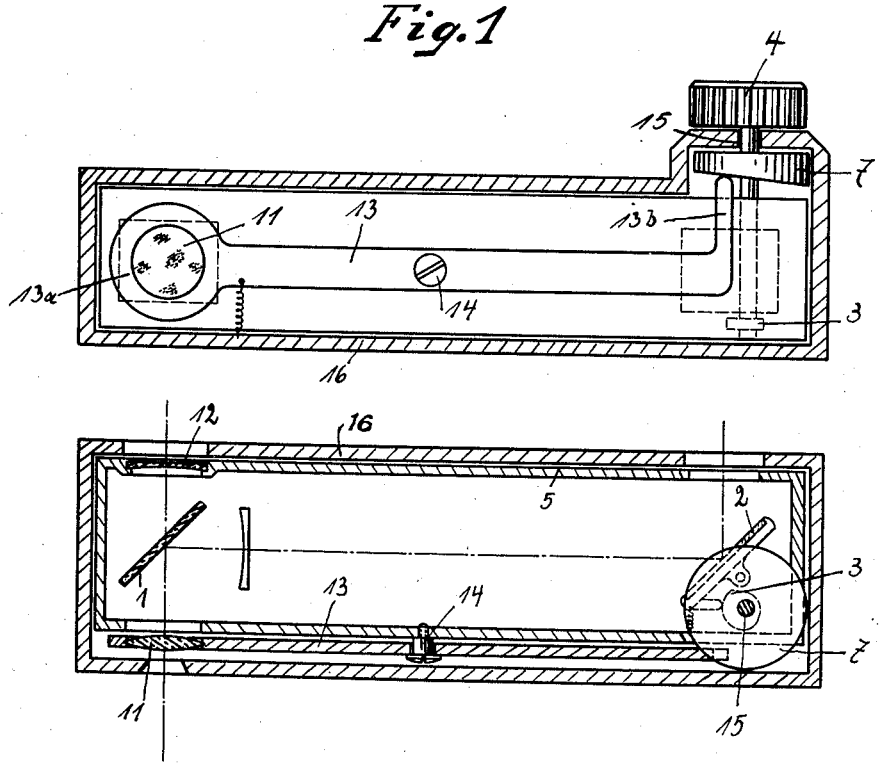

Patented Dec. 10, 1935

2,023,838

UNITED STATES PATENT OFFICE 2,023,838

COMBINED DISTANCE METER AND VIEW FINDER

Heinz Küppenbender and Martin Nowicki, Dresden, Germany, assignors to Zeiss Ikon Aktiengesellschaft Dresden, Dresden, Saxony, Germany Original application January 20, 1934, Serial No. 707,558. Divided and this application May 8, 1935, Serial No. 20,384. In Germany January 25, 1933

1 Claim. (Cl. 88—2.4)

This invention relates to a combined distance meter and view finder of the type described in patent application Serial Number 707,558, filed January 20, 1934, for use in connection with photographic cameras, wherein during focusing the object to be photographed in the view finder the distance meter connected therewith is automatically adjusted so that the parallax between the lens and the view finder disappears automatically when the distance meter is correctly adjusted. The exposure can take place as soon as the lens has been adjusted to the distance indicated on the distance meter and the dimensions of the photographic picture will accurately correspond with those of the image in the view finder. If the distance meter mechanism is positively connected with the lens adjusting mechanism, the lens can be automatically adjusted during the adjustment of the distance meter.

An embodiment of the invention is illustrated by way of example in the accompanying drawing in which:—

Fig. 1 shows in vertical section a combined distance meter and view finder according to the invention.

Fig. 2 is a horizontal section taken at half the height of Fig. 1.

The arrangement comprises an outer casing 16 and an inner casing 5 carrying the view finder lens 12. Two mirrors 1 and 2 are arranged one near each end of the casing 5, the mirror 2 being adjustable by means of a knob 4 through the intermediary of a cam 3 shown in dotted lines in both figures and mounted on an axle 15 carrying the knob 4. This axle is journalled in the outer casing and extends through the inner casing 5. The distance is adjusted by varying the direction of view through the view finder 12 or through the distance meter respectively simultaneously with the adjustment of the distance by shifting an eye lens 11. The eye lens 11 is mounted at one end 13a of a two-armed lever 13 pivotally mounted on a pin 14 fixed on the casing 5. A finger 13b formed on the other arm of the lever 13 contacts with a cam disc 7 keyed on the axle 15. When the knob 4 is turned to adjust the mirror 2, the eye lens 11 is simultaneously adjusted through the intermediary of the cam 7 and lever 13, so that the parallax of the view finder will be automatically removed.

We claim:—

A combined distance meter and view finder for photographic cameras, comprising in combination an outer casing, an inner casing in said outer casing, optical elements in said inner casing for measuring the distance between the lens and the object to be photographed, said elements including a pivotally mounted mirror, a two-armed lever pivotally mounted on said inner casing, a viewing lens mounted on one arm of said lever, a finger on the other arm of said lever, an axle carrying said mirror, a cam disc mounted on said axle and adapted to cooperate with said finger to move said lever and bring said lens out of the horizontal plane to eliminate the parallax of the view finger when said mirror is swung.

HEINZ KÜPPENBENDER.
MARTIN NOWICKI.